(12) United States Patent
Nagata (10) Patent No.: US 7,274,288 B2
(45) Date of Patent: Sep. 25, 2007

(54) VEHICLE ALARM SOUND OUTPUTTING DEVICE AND PROGRAM

(75) Inventor: Takashi Nagata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 170 days.

(21) Appl. No.: 11/153,382

(22) Filed: Jun. 16, 2005

(65) Prior Publication Data

US 2006/0001532 A1 Jan. 5, 2006

(30) Foreign Application Priority Data

Jun. 30, 2004 (JP) ............................. 2004-194020

(51) Int. Cl.
B60Q 1/00 (2006.01)
(52) U.S. Cl. ................. 340/438; 340/384.5; 340/384.7
(58) Field of Classification Search ................ 340/438, 340/903, 435, 692, 425.5, 459, 457, 460, 340/328, 384.1, 384.4, 384.5, 384.7
See application file for complete search history.

(56) References Cited

U.S. PATENT DOCUMENTS

| 4,528,563 | A | * | 7/1985 | Takeuchi | ..................... | 340/903 |
| 5,450,057 | A | | 9/1995 | Watanabe | | |
| 5,979,586 | A | | 11/1999 | Farmer et al. | | |
| 6,087,961 | A | * | 7/2000 | Markow | ..................... | 340/902 |
| 6,778,073 | B2 | * | 8/2004 | Lutter et al. | ................. | 340/435 |
| 6,876,298 | B2 | * | 4/2005 | Litkouhi et al. | ............ | 340/435 |
| 2002/0105418 | A1 | * | 8/2002 | Yurimoto et al. | ........... | 340/436 |
| 2003/0108212 | A1 | * | 6/2003 | Yun | ............................. | 381/86 |
| 2003/0141967 | A1 | | 7/2003 | Aichi et al. | | |

FOREIGN PATENT DOCUMENTS

| JP | A-2002-133596 | 5/2002 |
| JP | A-2003-141693 | 5/2003 |

* cited by examiner

*Primary Examiner*—Brent A. Swarthout
(74) *Attorney, Agent, or Firm*—Posz Law Group, PLC (57) ABSTRACT

In a vehicle alarm sound output device and a program, position data of an obstacle(s) and sound data of an alarm sound are output from an obstacle detector to DSP of a virtual sound source generator. Position data of a tire having air pressure abnormality and sound data of an alarm sound are output from an abnormality detector to DSP. Position data of a target object of a route guidance and sound data of a voice are output from a position detector to DSP. In DSP, an audio signal with which a virtual sound source can be implemented is created by using a detection signal/localization position converting table and head related transfer functions, and the audio signal thus created is output to a sound output unit. In the sound output unit, the signal corresponding to the audio signal is output to speakers so that a passenger(s) can hear an alarm sound such as a warning sound, a voice guidance or the like from the localization position of a virtual sound source.

2 Claims, 9 Drawing Sheets

VEHICLE ALARM SOUND OUTPUTTING DEVICE AND PROGRAM

CROSS REFERENCE TO RELATED APPLICATION

This application is based upon, claims the benefit of priority of, and incorporates by reference the contents of, Japanese Patent Application No. 2004-194020 filed on Jun. 30, 2004.

BACKGROUND OF THE INVENTION

1. Field of the Invention

The present invention relates to a vehicle alarm sound outputting device and a program for generating an alarm sound to warn existence of an obstacle or the like to a passenger(s) in a vehicle room or the like.

2. Description of the Related Art

An alarm sound outputting device disposed in a vehicle sometimes has such a situation that sound sources such as plural alarm sounds, guidance, etc. are simultaneously output in accordance with the state of the vehicle, the surrounding condition around the vehicle or the like. For example, when an obstacle located ahead of the vehicle is detected by a laser radar while a route is guided by a navigation device, a signal sound for warning detection of the obstacle is generated (see JP-A-2002-133596 (page 1, FIG. 5) (hereinafter referred to as Patent Document 1).

Furthermore, when an obstacle around a vehicle is detected by a sonar arranged around the vehicle while an incomplete door close state is warned, a signal sound for informing detection of the obstacle is generated as in the case of the above patent document 1 (see JP-A-2003-220911 (page 1, FIG. 14 (hereinafter referred to as Patent Document 2).

That is, in some cases, the conventional techniques described above have such a situation that sound sources such as plural alarm sounds, guidance, etc. are simultaneously output. In this case, perception performance of warning contents by passengers is lowered due to an acoustic masking phenomenon.

When the masking phenomenon is remarkable, information cannot be correctly supplied to a driver, and thus there is a probability that the driver's judgment is confused.

SUMMARY OF THE INVENTION

In view of the foregoing situation, it is an object to provide a vehicle alarm sound output device and a program which can correctly supply information to a passenger(s) even when sound sources such as plural alarm sounds, guidance, etc. are simultaneously output.

According to a first aspect, a vehicle alarm sound output device for driving an alarm sound outputting unit on the basis of information from a condition detecting unit (for example, a laser radar, a sonar, a camera or the like) for detecting the condition of a vehicle or the surrounding condition around the vehicle to output an alarm sound is equipped with a position setting unit for setting a localization position of a virtual sound source of the alarm sound in accordance with the detection result of the condition detecting unit, and an alarm control unit for controlling the alarm sound output device so that a passenger of the vehicle can hear the alarm sound from the virtual sound source, wherein when there are plural contents to be alarmed to the passenger in connection with the detection result of the condition detecting unit, the localization position of the virtual sound source and the sound type of the alarm sound are altered every content to be alarmed.

Accordingly, when there are contents to be alarmed to a passenger, the localization position of the virtual sound source and the sound type of the alarm sound are changed every content to be alarmed. Therefore, even when the respective contents are simultaneously alarmed, each of the respective contents can be easily acoustically identified by a cocktail-party effect.

Accordingly, the passenger can achieve information needed for driving at a proper timing and thus the invention is remarkably proper to safety driving.

According to a second aspect, the vehicle alarm sound output device further comprises a sound source input unit for inputting plural virtual sound sources which are different from one another in the sound type and localization position, an output controller for selecting plural virtual sound sources to be output from the plural different virtual sound sources in connection with the content to be alarmed, and a sound source synthesizer for combining the plural virtual sound sources thus selected to synthesize a virtual sound source wherein the alarm sound output unit is driven on the basis of the synthesized virtual sound source so that the passenger can hear different alarm sounds corresponding to the alarm contents.

A method of inputting the different virtual sound sources corresponding to different alarm contents and combining the input different virtual sound sources to output the different alarm sounds corresponding to the different alarm contents by the alarm sound output unit is provided.

According to a third aspect, the vehicle alarm sound output device further comprises a sound source input portion for inputting plural monaural sound sources different in sound type, an input controller for selecting plural monaural sound sources used to generate the virtual sound source from the plural different monaural sound sources in accordance with contents to be alarmed, a sound localizing unit for carrying out acoustic localization on respective virtual sound sources in connection with the contents to be alarmed by using the plural selected monaural sound sources, and a sound source synthesizer for combining the plural virtual sound sources on which the sound localization is carried out, thereby synthesizing a virtual sound source, wherein the alarm sound output unit is driven on the basis of the virtual sound source thus synthesized so that the passenger hears different alarm sounds corresponding to the alarm contents.

A method of inputting different monaural sound sources corresponding to different alarm contents to generate different virtual sound sources, and combining the virtual sound sources thus generated to output different alarm sounds corresponding to the different alarm contents by the alarm sound output unit is provided.

According to a fourth aspect, the monaural sound sources are subjected to the sound localization on a real-time basis to generate the virtual sound sources.

Generation of virtual sound sources on a real-time basis is also provided.

According to a fifth aspect, the vehicle alarm sound output device sets priorities to the contents to be alarmed to the passenger, and adjusts the sound volume of each of the virtual sound sources in accordance with the priorities.

When the priorities are given to the contents to be alarmed, the sound volume for a content to be alarmed is increased as the priority given to the content is higher. For example, when an obstacle ahead of the vehicle concerned is detected and also an incompletely closed door is detected, the sound volume for the obstacle is set to be larger than that for the incompletely closed door, whereby the driving safety can be further enhanced.

According to a sixth aspect, the sound volume of the virtual sound source is adjusted in accordance with an ambient noise level in the vehicle.

For example, when the ambient noise in the vehicle room is large, the sound volume of the virtual sound source is increased, whereby the passenger can be made to surely recognize the alarm content.

According to a seventh aspect, the sound type of the alarm sound is set by tone or a sound frequency band.

A method of making the passenger hear an alarm sound with different sounds is provided. For example, the sound tone of the alarm sound is varied like the sound tone of a musical instrument or the frequency of the sound of the alarm sound is varied, whereby the passenger can clearly discriminate and identify the alarm sound.

According to an eighth aspect, the localization position of the virtual sound source is set to the position corresponding to the content to be alarmed.

For example, when an incompletely closed door is detected during travel, the localization position of the virtual sound source is set so that the passenger hears the alarm sound from the position of the incompletely closed door. Accordingly, the content being alarmed can be more clearly grasped by the passenger.

According to a ninth aspect, the method of generating the virtual sound source is a stereo dipole type.

A method of generating the virtual sound source is showed.

According to a tenth aspect, the vehicle alarm sound output device is further equipped with a filter coefficient generator for generating virtual sound source filter coefficients in accordance with the localization positions of the plural virtual sound sources, and a calculator for converting each of the respective virtual sound source filter coefficients and the acoustic data of the alarm sound from the real-number value of a time domain to the complex-number value of a frequency domain by fast Fourier transform, generating plural virtual sound sources by complex-number calculation between each of the virtual sound source filter coefficient and the acoustic data of the alarm sound in the frequency domain, combining the plural virtual sound sources by complex-number addition, and converting the plural virtual sound sources thus combined from the complex-number value of the frequency domain to the real-number value of the time domain by inversed Fast Fourier Transform.

A method of calculating the virtual sound source is provided. As described above, the calculation is carried out in the frequency domain by using the Fast Fourier Transform (FFT) and the inverse Fast Fourier Transform (inverse FFT) to reduce the load of the calculation.

According to an eleventh aspect, there is provided a program for making a computer implement the function of the vehicle alarm sound output device of any one of the first to tenth aspects. That is, the function of the vehicle alarm sound output device described above can be implemented by the processing executed by the program of the computer.

In the case of the program as described above, the program may be recorded in a computer-readable recording medium such as FD, MO, DVD-ROM, CD-ROM, a hard disk or the like so that the program can be loaded into a computer and started. In addition, the program may be recorded in ROM or back-up RAM as a computer-readable recording medium so that the program can be used while ROM or back-up RAM is installed in the computer.

DETAILED DESCRIPTION OF THE PREFERRED EMBODIMENTS

Preferred embodiments according to the invention will be described hereunder with reference to the accompanying drawings.

First Embodiment

Figure 1:
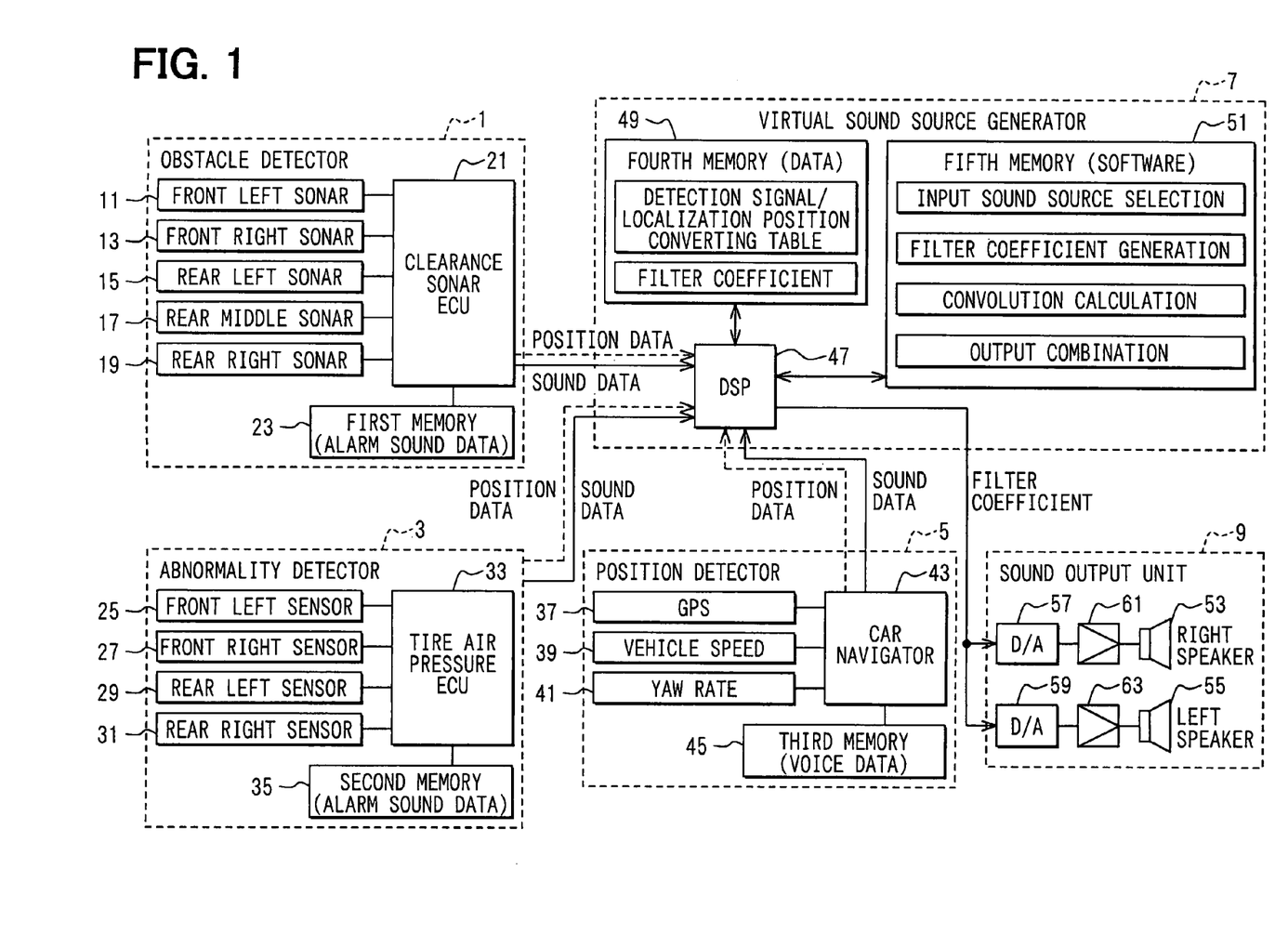
FIG. 1 is a diagram showing a system construction of a vehicle alarm sound output device according to a first embodiment.

First, the system construction of a vehicle in which a vehicle alarm sound output device of this embodiment is mounted will be described with reference to FIG. 1.

In this embodiment, the system for carrying out alarm sound output control to output an alarm sound to a passenger (s) is mainly equipped with an obstacle detector 1 for detecting an obstacle(s) around the vehicle concerned, an abnormality detector 3 for detecting abnormality of the vehicle concerned, a position detector 5 for detecting the position of the vehicle concerned, a virtual sound source generator 7 for generating a virtual sound source(s) and a sound output unit 9 for outputting an alarm sound(s) based on a virtual sound source(s).

The obstacle detector 1 is equipped with a front left sonar 11, a front right sonar 13, a rear left sonar 15, a rear middle sonar 17 and a rear right sonar 19 as ultrasonic devices for detecting an obstacle(s) around the vehicle, and also equipped with a clearance sonar ECU 21 serving as an electronic controller for controlling the operation of the obstacle detector 1. Acoustic data (alarm sound data) corresponding to an alarm sound(s) are stored in a first memory 23.

The abnormality detector 3 is equipped with a front left sensor 25, a front right sensor 27, a rear left sensor 29 and a rear right sensor 31 as pressure sensors for detecting abnormality of air pressure of the tires of the vehicle concerned, and also equipped with a tire air pressure ECU 33 serving as an electronic controller for controlling the operation of the abnormality detector 33. Acoustic data corresponding to alarm sounds (alarm sound data) are stored in a second memory 35.

Different sound types (for example, different tones or frequency bands) are allocated as the alarm sound every obstacle detector 1 or abnormality detector 3. As a method of changing the sound type of the alarm sound, continuity/intermittence of sound, inflection/flatness, chime/buzzer/music instrument/voice or chord/monotone may be used in addition to the method of varying the tone or the frequency band. Here, when the sound type is varied like chime/buzzer/music instrument/voice, etc., the frequency component and frequency band of the sound signal of the sound concerned are different. Furthermore, when the tone is varied like various kinds of music instruments, it may be considered to change not only the tone, but also tone interval (the main component of the frequency).

A front monitoring device using a laser radar may be adopted as the obstacle detector 1, and a door open/close state detecting device may be used as the abnormality detector 3.

The position detector 5 is used to detect the travel position of the vehicle concerned, and it is equipped with a GPS device 37, a vehicle speed sensor 39 and a yaw rate sensor 41 and also with a car navigation device 43 for carrying out route guidance of the vehicle on the basis of map data, etc. Furthermore, voice data for carrying out route guidance are stored in a third memory 45.

The alarm sound data and the voice data may be stored in a fourth memory 49 of the virtual sound source generator 7 or the like.

The virtual sound source generator 7 is equipped with DSP (digital signal processor) 47, a fourth memory 49 for storing various kinds of data such as filter coefficients, etc., and a fifth memory 51 for storing software, etc.

In the fourth memory 49 are stored a detection signal/localization position converting table indicating the conversion relationship between a detection signal indicating the position of an obstacle or the like and the localization position of a virtual sound source and filter coefficients such as a head related transfer function (HRTF), etc. Furthermore, in the fifth memory 51 are stored a program for selecting an input sound source, a program for generating filter coefficients, a program for convolution calculation, a program for combining the outputs of plural virtual sound sources, etc. Here, the function of software installed in the virtual sound source generator 7 may be implemented by hardware without using operation function of DSP 47. The head related transfer function is a coefficient for determining the localization position when a sound is heard by right and left ears (for generating a binaural sound source) as well known.

The sound output unit 9 is equipped with a pair of right and left speakers 53, 55, and D/A 57, 59 and amplifiers 61, 63 are equipped in connection with the respective speakers 53, 55.

Accordingly, in the construction system described above, the position data (detection signal) of an obstacle(s) detected by each sonar 11 to 19 and the acoustic data (monaural sound source) of an alarm sound(s) are output from a clearance sonar ECU 21 of the obstacle detector 1 to DSP 47 of the virtual source generator 7. Likewise, the position data of a tire(s) whose air pressure is abnormal and the acoustic data of an alarm sound(s) (monaural sound source(s)) are output from a tire air pressure ECU 33 of the abnormality detector 1 to DSP 47 of the virtual source generator 7. Furthermore, the position data of a target object(s) for route guidance and the acoustic data corresponding to voices (audio data: monaural sound source) are output from a navigation device 43 of the position detector 5 to DSP 47 of the virtual sound source generator 7.

In DSP 47, a sound signal with which a virtual sound source can be implemented is created according to each program by using a detection signal/localization position conversion table and a head related transfer function, and the sound signal is output to the sound output unit 9.

In the sound output unit 9, the driving signal corresponding to the sound signal is output to each of speakers 53 and 55 to actuate the speakers 53 and 55 so that the passenger(s) hear an alarm sound or an alarm sound such as a voice guidance or the like from the localization position of a virtual sound source.

Next, the operation of this embodiment will be described together with the principle thereof.

In this embodiment, the alarm sound corresponding to each alarm content based on each virtual sound source is output to the passenger(s) by using plural virtual sound sources (in this case, three kinds of acoustic data of alarm sounds when an obstacle is detected, alarm sound data when abnormality of the vehicle is detected, voice data when a route guidance is made) are used at the same time for a passenger(s). That is, the sound type of the alarm sound (for example, tone or frequency) or the localization position of the virtual sound source is changed so that the passenger(s) hear different alarm sounds from different virtual sound sources. The details thereof will be described hereunder.

First, a basic method of generating a virtual sound source will be described.

Figure 2:
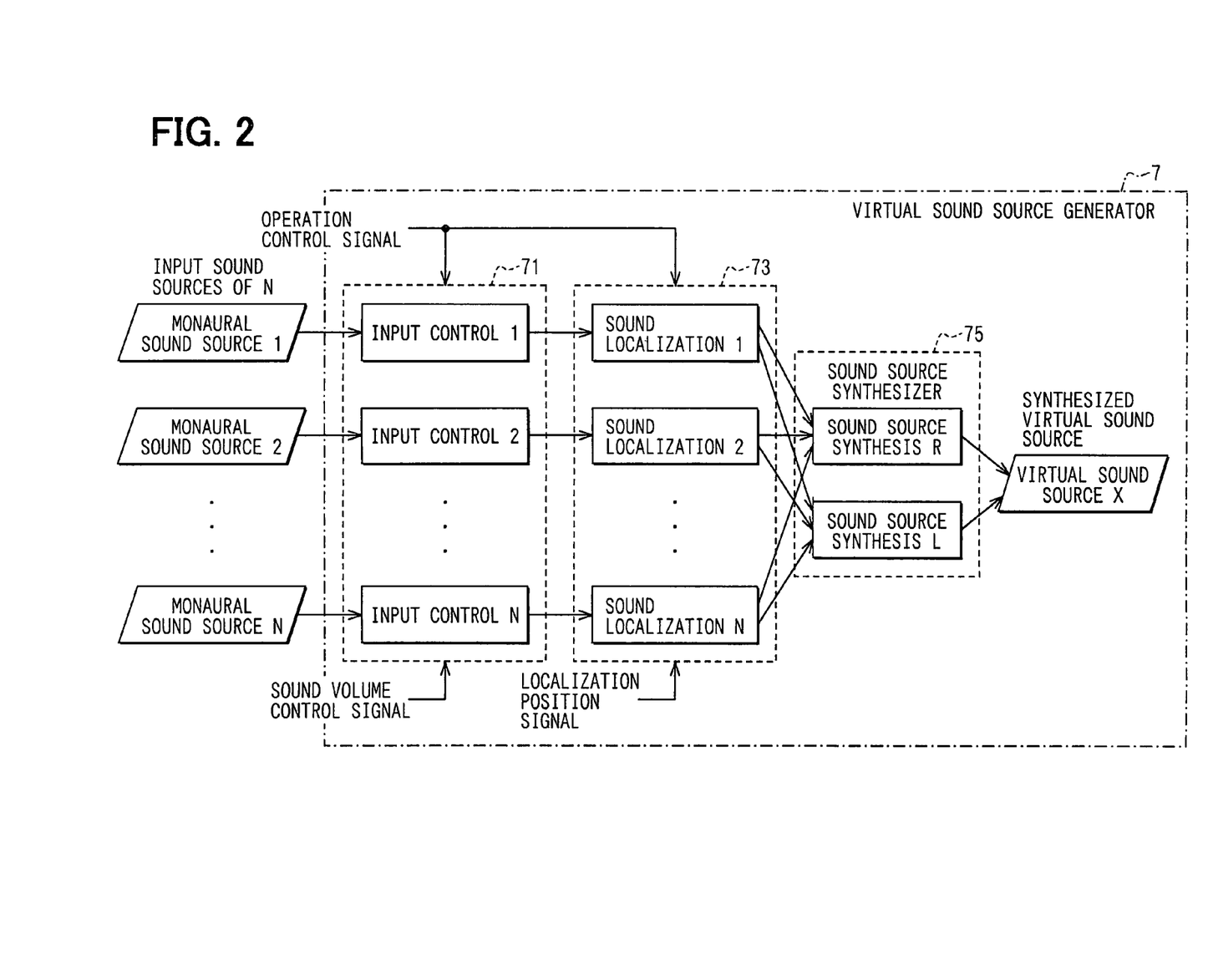
FIG. 2 is a diagram showing the procedure of calculation processing of the first embodiment.

As functionally shown in FIG. 2, in a case where there are monaural sound sources of N (three in this embodiment), the processing of generating a virtual sound source(s), etc. are carried out by the operation of DSP 47 when the monaural sound sources are input to the virtual sound source generator 7.

Specifically, it is selected on the basis of an operation control signal (of DSP47) in an input controller 71 which monaural sound source is selected, and also the sound volume of enunciation is set on the basis of a sound volume control signal (of DSP47).

For example, it is selected which one acoustic data of the alarm sounds from the obstacle detector 1, the alarm sound data from the abnormality detector 3 and the voice data from the position detector 5 should be used and also it is determined how degree of sound volume should be set. The sound volume is properly set in accordance with the condition so that it is set to a larger value when the priority of the acoustic data is higher or as the noise level in the vehicle room is higher.

Subsequently, in a sound localizing unit 73, the sound localization of a virtual sound source at which an alarm sound should be output, that is, the localization position of the virtual sound source is set on the basis of the position data of an obstacle, occurrence position of abnormality or the like (localization position signal). In this embodiment, alarm sounds are heard from plural virtual sound sources, and thus the localization positions of virtual sound sources are set in connection with plural monaural sound sources.

Subsequently, the plural virtual sound sources are combined with one another in a sound source synthesizer 75 to generate virtual sound sources. In this case, plural virtual sound sources are implemented by a pair of speakers 53 and 55, and thus (synthesized virtual sound) to be output to each of the pair of speakers 53, 55 is generated so that the plural virtual sound sources can be implemented.

2-channel sound signals (corresponding to the right and left speakers 53, 55) achieved through the above synthesis are reproduced and output from the right and left speakers 53, 55 of the sound output unit 9, whereby virtual sound sources are implemented at plural desired localization positions. That is, the virtual sound sources are implemented as if the driver hears alarm sounds having different contents with different tones from different positions in different directions (attention attracting directions).

The input controller 71, the sound localizing unit 73 and the sound source synthesizer 75 functionally represent the processing contents carried out by DSP 47. The processing of these blocks may be carried out time-divisionally by DSP 47.

Next, the details of the calculation method will be described in more detail.

In order to simplify the description, a case where two virtual sound sources are generated by using two monaural sound sources will be described.

Figure 3:
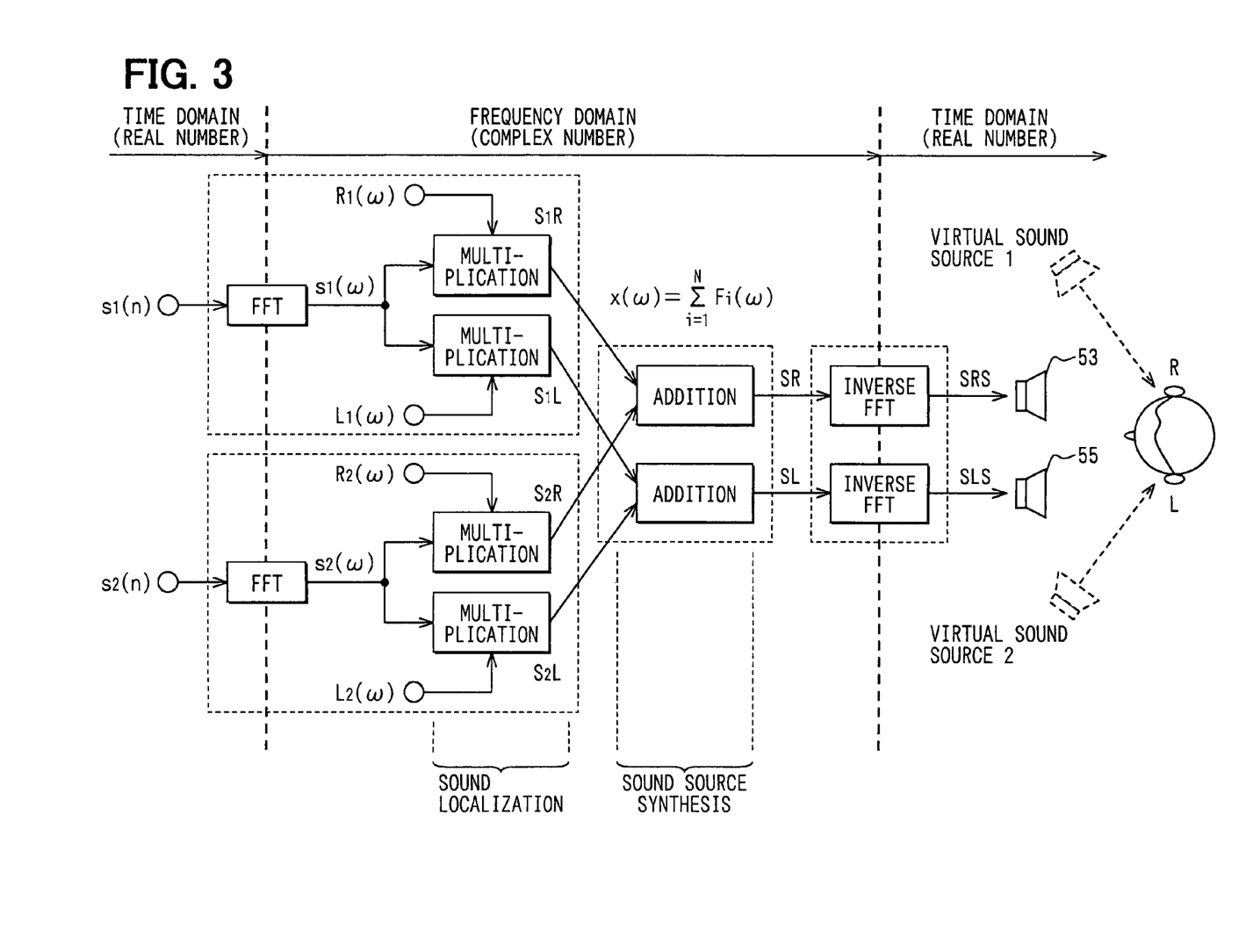
FIG. 3 is a diagram showing the content of the procedure of the calculation processing of the first embodiment.

As shown in FIG. 3, two monaural sound sources s1(n), s2(n) represented by real numbers in the time domain are subjected to Fast Fourier Transform (FFT) to generate two sound source data s1(ω), s2(ω) represented by complex numbers in the frequency domain.

Subsequently, one sound source data s1(ω) is multiplied by a filter coefficient R1(ω) for the right speaker, and also the sound source data s1(ω) is multiplied by a filter coefficient L1(ω) for the left speaker, thereby carrying out sound localization corresponding to one monaural sound source described above. That is, the calculation values S1R, S1L (for the sound localization) corresponding to the right and left speakers achieved from one monaural sound source are determined.

Similarly, other sound source data s2(ω) is multiplied by a filter coefficient R2(ω) for the right speaker, and also the sound source data s2(ω) is multiplied by a filter coefficient L2(ω) for the left speaker, thereby carrying out image sound localization corresponding to other monaural sound source described above. That is, the calculation values S2R, S2L (for the sound localization) corresponding to the right and left speakers achieved from other monaural sound source are determined.

The calculation values S1R, S1L, S2R, S2L are filter coefficients achieved from head related transfer functions corresponding to position data of an obstacle or the like (thus, the localization position of a virtual sound source 1), and contain a calculation result for removing well-known cross talk to implement a virtual sound source by the right and left speakers 53, 55.

Subsequently, the calculation values S1R, S1L, S2R, S2L each of which is generated in connection with the right and left speakers 53, 55 from each monaural sound source are combined by using the following equation (1).

$$X(\omega) = \sum_{i=1}^{N} Fi(\omega) \qquad (1)$$

Specifically, in connection with the right speaker 53, the calculation value S1R for the right speaker 53 of one of the monaural sound sources and the calculation value S2R for the right speaker 53 of the other monaural sound source are added to each other to calculate an addition value SR.

Likewise, in connection with the left speaker 55, the calculation value S1L for the left speaker 55 of one of the monaural sound sources and the calculation value S2L for the left speaker 55 of the other monaural sound source are added to each other to calculate an addition value SL.

Subsequently, two addition values SR and SL represented by complex numbers in the frequency domain are subjected to inverse Fast Fourier Transform (inverse FFT) to achieve output signals SRS and SLS for the two speakers which are represented by real numbers in the time domain.

Accordingly, the right and left speaker output signals SRS and SLS are output to the right and left speakers 53 and 55 respectively, whereby the virtual sound source 1 corresponding to one of the monaural sound source can be implemented and also the virtual sound source 2 corresponding to the other monaural sound source can be implemented.

Accordingly, for example, an alarm sound (having some tone) warning passenger(s) of existence of an obstacle is heard from the localization position of the virtual sound source 1, and also an alarm sound (having a different tone) warning the passenger(s) of abnormality of air pressure is heard from the localization position of the virtual sound source 2.

The filter coefficient located at the localization position at the virtual sound source (virtual sound source filter coefficient) may be converted to a value in the frequency domain in advance.

Next, the actual processing procedure of this embodiment will be described with reference to FIGS. 4 to 7.

(1) (Processing Relating to Detection of Obstacle)

Figure 4:
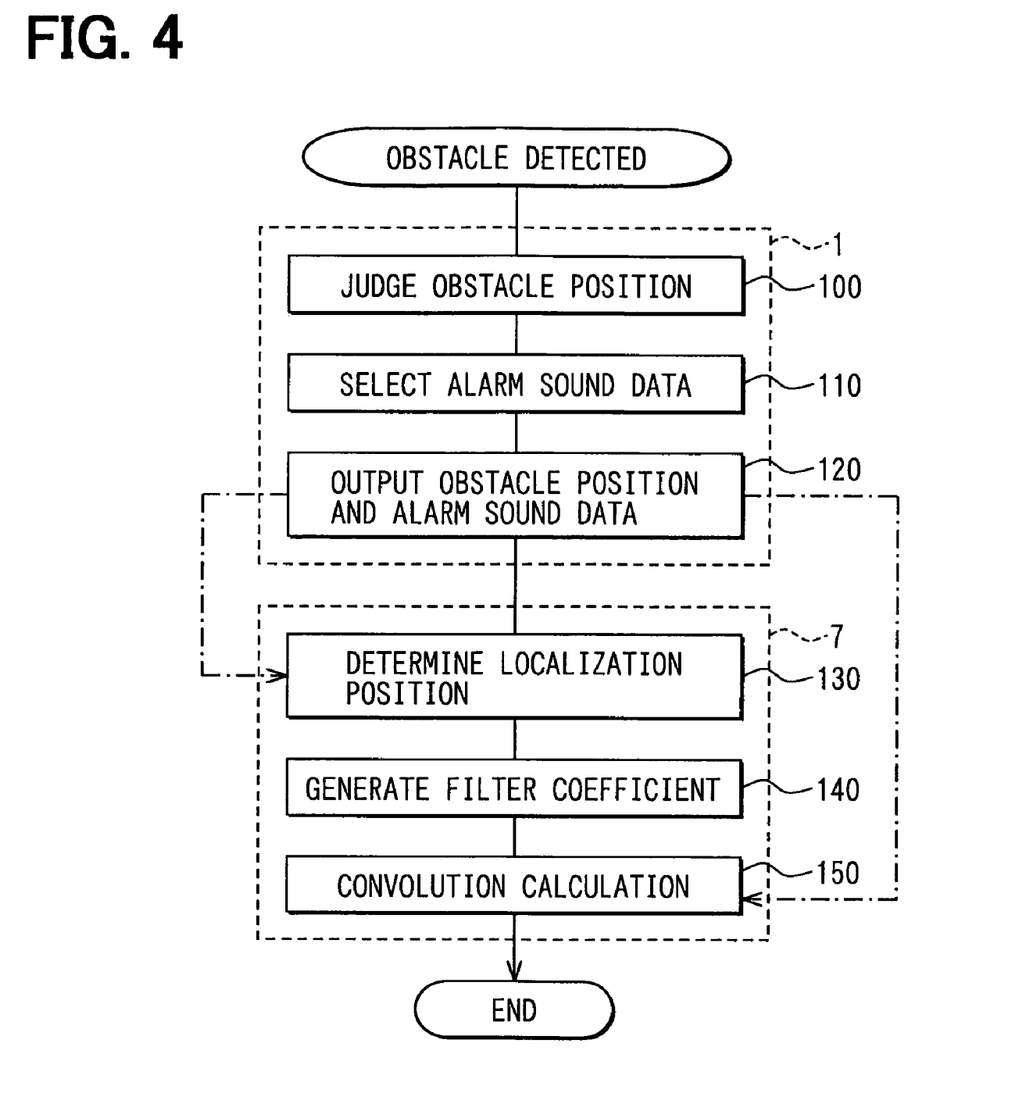
FIG. 4 is a flowchart showing the processing relating to detection of an obstacle in the calculation processing of the first embodiment.

The processing of steps 100 to 120 of the flowchart of FIG. 4 is carried out in the clearance sonar ECU 21 of the obstacle detector 1, and the processing of 130 to 150 is carried out in DSP 47 of the virtual sound source generator 7.

In step 100 of FIG. 4, the position of the obstacle is judged on the basis of the detection result of the obstacle which was achieved by using each sonar 11 to 19.

In subsequent step 110, alarm sound data is selected. For example, alarm sound data indicating a buzzer sound is selected.

In subsequent step 120, the obstacle position and the alarm sound data are output to DSP 47 of the virtual sound source generator 7.

In step 130, the localization position of the virtual sound source is determined in connection with the position of the obstacle in DSP 47. For example, the virtual sound source is set at the same position as the obstacle or in the same direction as the obstacle (the attention attracting direction) although the positions thereof are different from each other.

In subsequent step 140, filter coefficients (virtual sound source filter coefficients) are generated by using the head related transfer functions corresponding to the localization position so that cross-talk is removed. That is, the right and left speaker output coefficients are generated.

In subsequent step 150, well-known convolution calculation is carried out by using the virtual sound source filter coefficients and the alarm sound data to calculate the calculation values S1R, S1L corresponding to the right and left speakers 53 and 55 in accordance with a first monaural sound source (the alarm sound data of a buzzer sound), and this processing is temporarily finished.

(2) (Processing Relating to Detection of Abnormality of Tire Air Pressure)

Figure 5:
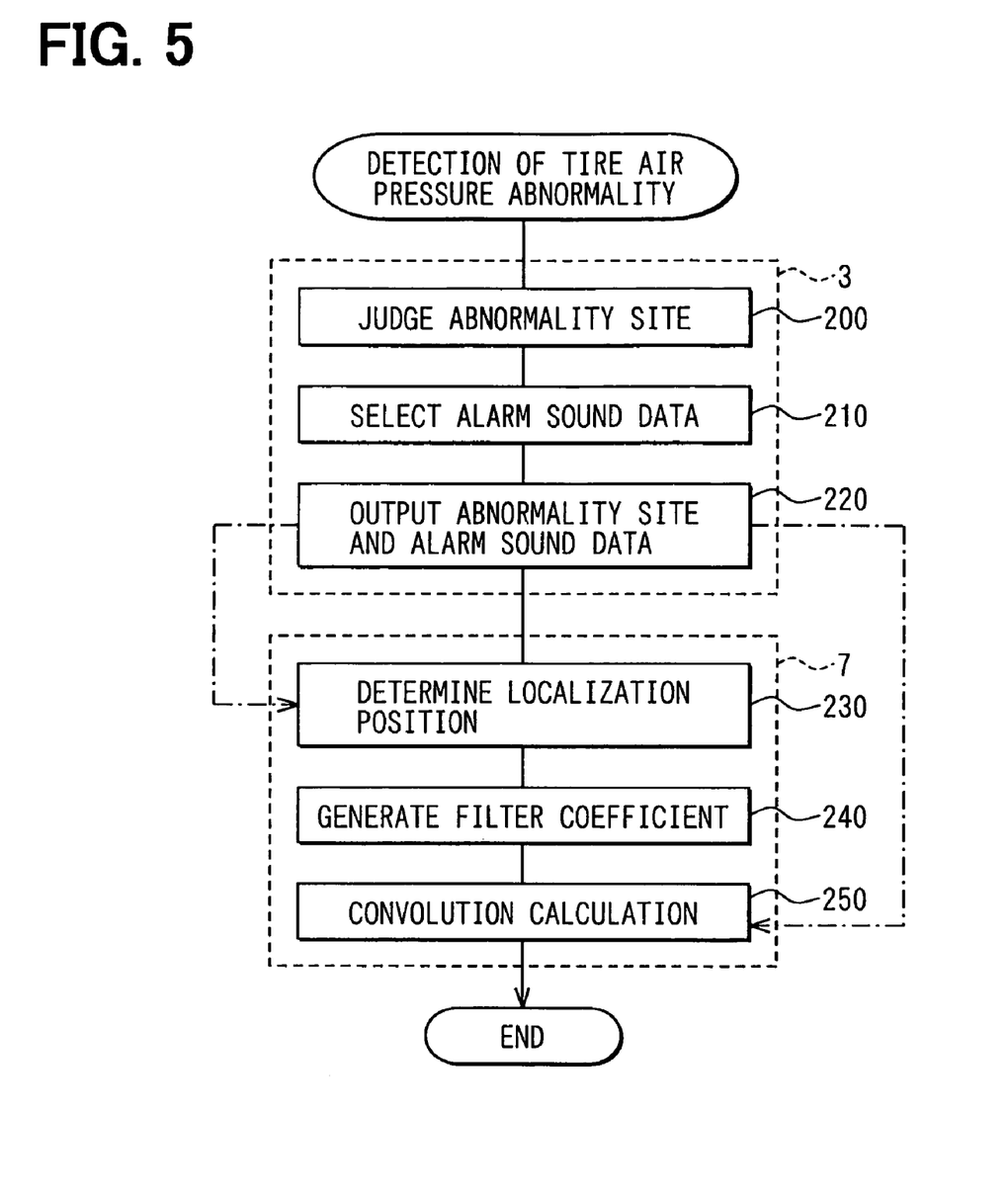
FIG. 5 is a flowchart showing the processing relating to detection of tire air pressure abnormality in the calculation processing of the first embodiment.

The processing of steps 200 to 220 in the flowchart of FIG. 5 is carried out in the tire air pressure ECU 33 of the abnormality detector 3, and the processing of steps 230 to 250 is carried out in DSP 47 of the virtual sound source generator 7.

In step 200 of FIG. 5, an abnormality site is judged on the basis of an abnormality detection result achieved by using the respective sensors 25 to 31.

In subsequent step 210, alarm sound data indicating the abnormality site (having a tone different from the alarm sound data of the obstacle described above) is selected. For example, alarm sound data indicating a chime sound is selected.

In subsequent step 220, the abnormality site and the alarm sound data are output to DSP 47 of the virtual sound source generator 7.

In step 230, the localization position of the virtual sound source is determined in connection with the abnormality site in DSP 47. For example, the virtual sound source is set at the same position as the abnormality site or in the same direction as the abnormality site (attention attracting direction) although the positions thereof are different from each other.

In subsequent step 240, filter coefficients (virtual sound source filter coefficients) are generated by using the head related transfer functions corresponding to the localization position so that cross talk is removed. That is, coefficients for the outputs of the right and left speakers are generated.

In subsequent step 250, well-known convolution calculation is carried out by using the virtual sound source filter coefficients and the alarm sound data to calculate the calculation values S2R and S2L corresponding to the right and left speakers 53 and 55 in accordance with a second monaural sound source (the alarm sound data of the chime sound), and this processing is temporarily finished.

(3) (Processing Relating to Detection of the Position of the Vehicle Concerned)

Figure 6:
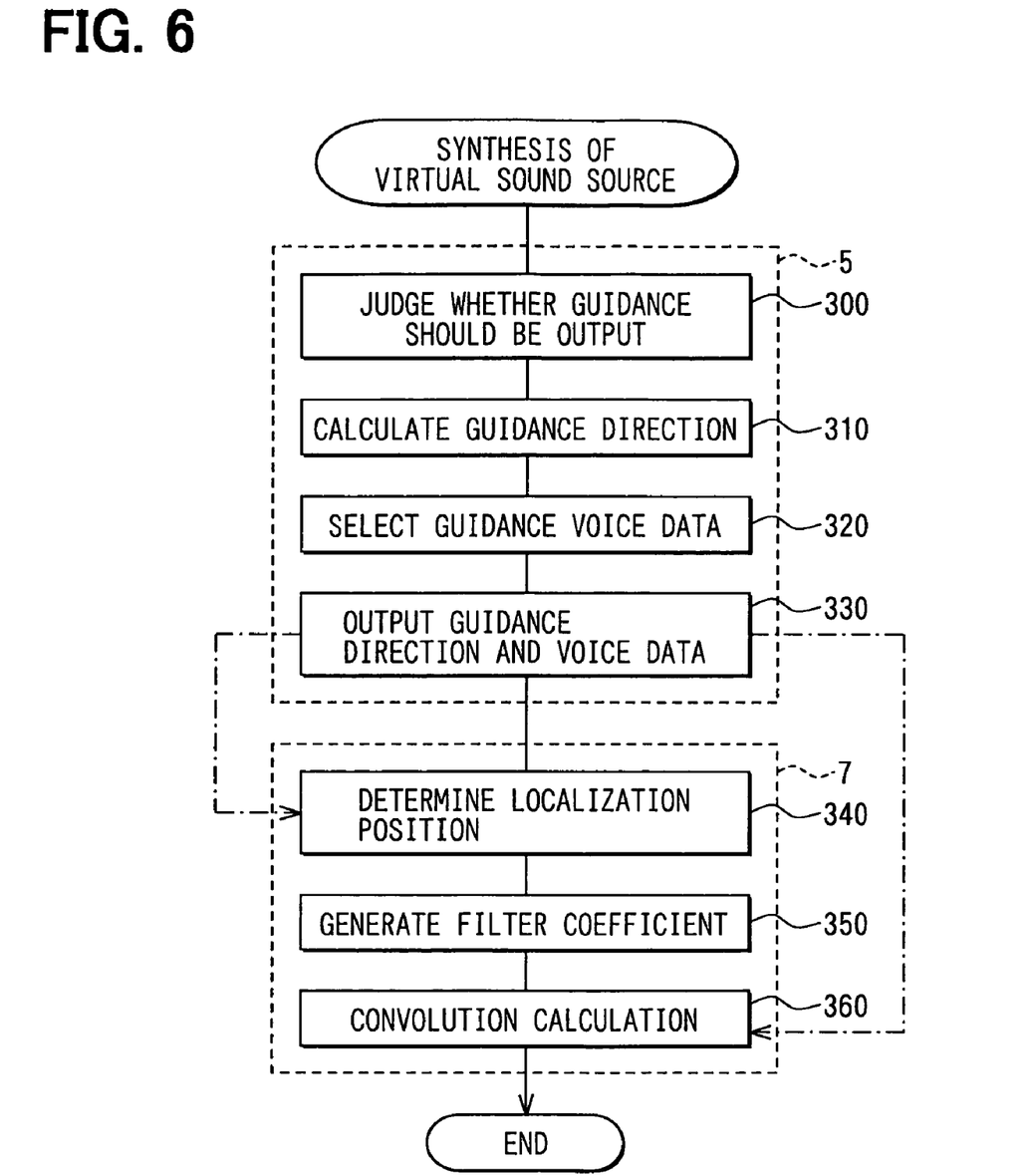
FIG. 6 is a flowchart showing the processing relating to detection of the position of a vehicle concerned in the calculation processing of the first embodiment.

The processing of steps 300 to 330 in the flowchart of FIG. 6 is carried out in the navigation device 43 of the position detector 5, and the processing of steps 340 to 360 is carried out in DSP 47 of the virtual sound source generator 7.

In step 300 of FIG. 6, on the basis of the detection result of the position of the vehicle concerned which is achieved by GPS 37, the vehicle speed sensor 39 and the yaw rate sensor 41, it is judged whether a guidance such as a route guidance or the like should be output.

In subsequent step 310, a guidance direction (the direction in which the guidance should be carried out) is determined on the basis of the positional relationship between the position of the vehicle concerned and a guidance target object.

In subsequent step 320, guidance voice data is selected. In subsequent step 330, the guidance direction and the guidance voice data are output to DSP 47 of the virtual sound source generator 7.

In step 340, the localization position of the virtual sound source is determined in conformity with the guidance direction. For example, the virtual sound source is set in the guidance direction so as to be far away from the vehicle concerned at a prescribed distance.

In subsequent step 350, filter coefficients (virtual sound source filter coefficients) are generated by using the head related transfer functions corresponding to the localization position so that cross talk is removed. That is, coefficients for the outputs of the right and left speakers are generated.

In subsequent step 360, well-known convolution calculation is carried out by using the virtual sound source filter coefficients and alarm sound data to calculate the calculation values S3R and S3L corresponding to the right and left speakers 53 and 55 in accordance with a third monaural sound source (guidance voice data), and this processing is temporarily finished.

(4) (Processing Relating to Combination of Virtual Sound Sources)

Figure 7:
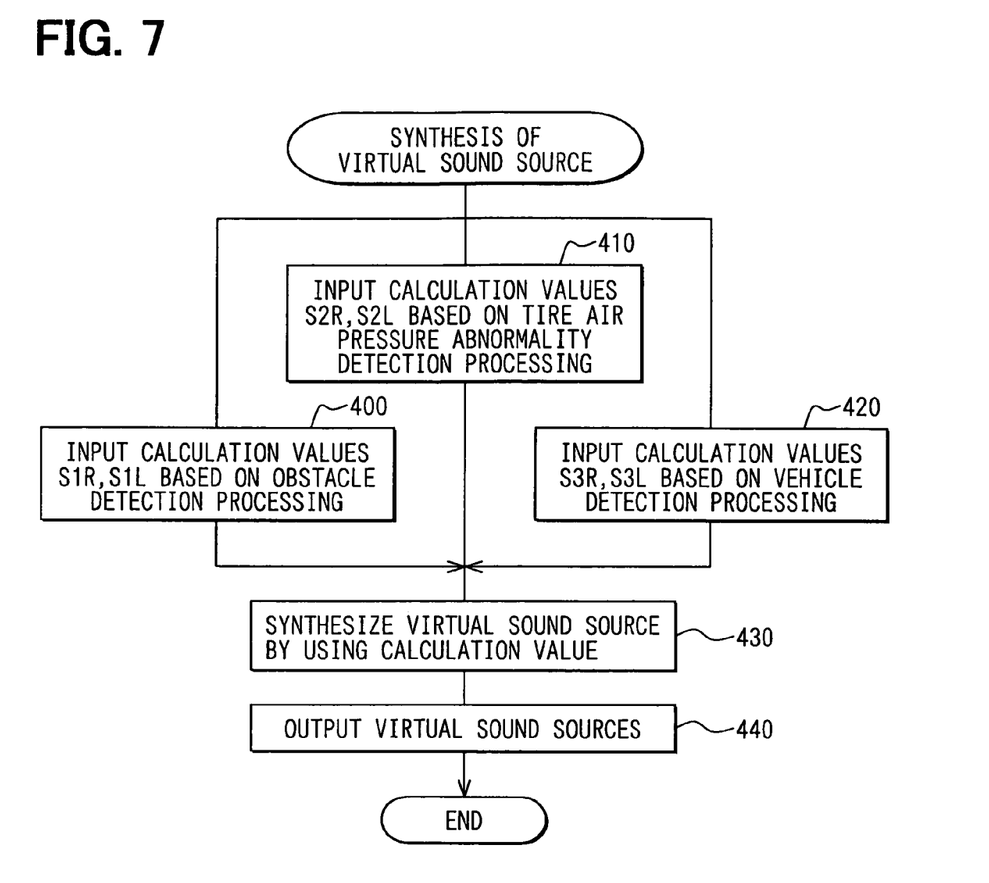
FIG. 7 is a flowchart showing synthesis processing of virtual sound sources in the calculation processing of the first embodiment.

The processing of steps 400 to 440 in the flowchart of FIG. 7 is carried out in the DSP 47 of the virtual sound source generator 7.

In step 400 of FIG. 7, the calculation values S1R and S1L based on the obstacle detection processing of FIG. 4 are input.

In step 410, the calculation values S2R and S2L based on the abnormality detection processing of FIG. 5 are input.

In step 420, the calculation values S3R and S3L based on the vehicle position detection processing of FIG. 6 are input.

The processing of the steps 400, 410 and 420 correspond to the processing of inputting each of the calculation values S1R, S1L, S2R, S2L, S3R, S3L which are processed separately from each other. The input order of the calculation values is not limited to a specific one, however, the processing of successively inputting the calculation values like the steps 400, 410 and 420 may be carried out.

In step 430, the processing of adding the respective calculation values S1R, S1L, S2R, S2L, S3R, S3L is carried out in connection with each of the right and left speakers by using the respective calculation values.

That is, by using the equation (1), the calculation values S1R, S2R and S3R are added in connection with the right speaker, and the calculation values S1L, S2L and S3L are added in connection with the left speaker and then the addition values SR and SL are determined.

In subsequent step 440, the speaker output signals SRS and SLS which correspond to the right and left speakers 53 and 55 respectively are determined from the addition values SR and SL corresponding to the right and left speakers, respectively.

Then, the speaker output signals SRS and SLS are output to the right and left speakers 53 and 55, whereby alarm sound and voice which are different in tone are output from three different virtual sound sources.

In the above flowchart, the description on the FFT and the inverse FFT are omitted.

As described above, in this embodiment, the monaural sound sources having different tones are set in connection with the three types of different processing (the obstacle detection processing, the abnormality detection processing and the vehicle position detection processing), and the three types of virtual sound sources (different in tone and localization position) are generated on a real-time basis in connection with the position of the obstacle, the position of the abnormality site and the position (direction) of the voice guidance achieved through the respective processing by using the different monaural sound sources described above.

By using these different virtual sound sources, the driver is enabled to hear alarm sounds and a guidance voice from different positions (directions) with different tones.

Accordingly, even when the respective alarm sounds and the guidance voice are simultaneously output from the speakers 53 and 55, the respective alarm sounds and the guidance voice are prevented from being mutually masked by the so-called cocktail party effect, so that accurate information can be transferred to the driver.

In this embodiment, the driving safety can be enhanced by increasing the sound volume as the priority of a content to be alarmed to a passenger(s) is higher. Furthermore, the passenger(s) can more surely recognize the alarm content as the noise in the vehicle room is larger and the sound volume is increased.

In this embodiment, the inverse FFT is carried out after the sound sources are combined, and thus there is an advantage that the calculation processing of the inverse FFT is reduced.

Second Embodiment

Next, a second embodiment will be described, and the same content as the first embodiment is omitted from the following description.

The system construction of the vehicle in which the vehicle alarm sound output device of this embodiment is mounted is basically the same as the first embodiment, and mainly greatly different from the first embodiment in the content to be processed. Therefore, this difference will be described.

In order to simplify the description, a case where two virtual sound sources are generated by using two monaural sound sources will be described.

Figure 8:
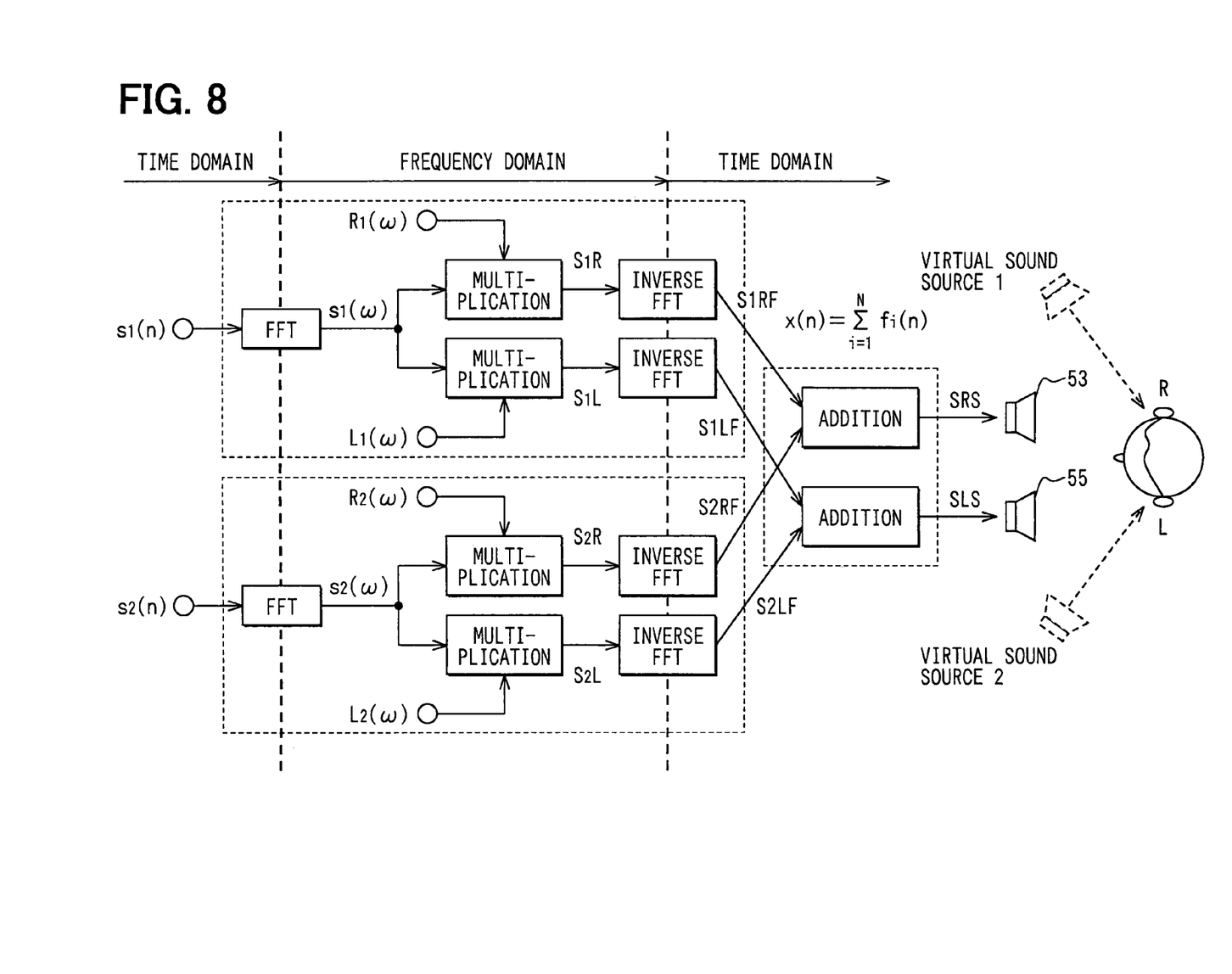
FIG. 8 is a diagram showing the content of the procedure of calculation processing of a second embodiment.

As shown in FIG. 8, two monaural sound sources $s1(n)$, $s2(n)$ represented by real numbers in the time domain are subjected to Fast Fourier Transform (FFT) to generate two sound source data $s1(\omega)$, $s2(\omega)$ represented by complex numbers in the frequency domain.

Next, one of the sound source data $s1(\omega)$ and the filter coefficient $R1(\omega)$ for the right speaker are multiplied by each other, and the sound source data $s1(\omega)$ and the filter coefficient $L1(\omega)$ for the left speaker are multiplied by each other to carry out sound localization corresponding to the one monaural sound source. That is, the calculation values S1R, S1L (for the sound localization) corresponding to the right and left speakers which are achieved by the one monaural sound source are determined.

Likewise, the other sound source data $s2(\omega)$ and the filter coefficient $R2(\omega)$ for the right speaker are multiplied by each other, and the sound source data $s2(\omega)$ and the filter coefficient $L2(\omega)$ for the left speaker are multiplied by each other to carry out the sound localization corresponding to the other monaural sound source. That is, the calculation values S2R and S2L (for the sound localization) corresponding to the right and left speakers which are achieved from the other monaural sound source are determined.

Subsequently, the four calculation values S1R, S1L, S2R and S2L represented by complex numbers in the frequency domain are subjected to the inverse Fast Fourier Transform (inverse FFT) to achieve the four calculation values S1RF, S1LF, S2RF and S2LF represented by real numbers in the time domain.

Subsequently, by using the following equation (2), the combination of the calculation values S1RF, S1LF, S2RF and S2LF is carried out for the right and left speakers 53 and 55.

$$X(n) = \sum_{i=1}^{N} fi(n) \qquad (2)$$

Specifically, the calculation value S1RF for the right speaker 53 of one of the monaural sound sources and the calculation value S2RF for the right speaker 53 of the other monaural sound source are added to each other to achieve the signal SRS for the output of the right speaker.

Likewise, the calculation value S1LF for the left speaker 55 of one of the monaural sound sources and the calculation value S2LF for the left speaker 55 of the other monaural sound source are added to each other to achieve the signal SLS for the output of the left speaker.

Accordingly, the signals SRS and SLS for the outputs of the right and left speakers are output to the right and left speakers 53 and 55 respectively, whereby the virtual sound source 1 corresponding to one of the monaural sound sources can be implemented and also the virtual sound source 2 corresponding to the other monaural sound source can be implemented.

That is, according to this embodiment, the passenger(s) can hear an alarm sound warning the passenger(s) of existence of an obstacle from the localization position of the virtual sound source 1, and also hear an alarm sound warning the passenger(s) of abnormality of air pressure from the localization position of the virtual sound source 2, for example. This embodiment has the same effect as the embodiment 1.

Third Embodiment

Next, a third embodiment will be described, however, the description of the same content as the first embodiment is omitted.

The system construction of the vehicle in which the vehicle alarm sound output device of this embodiment is mounted is basically the same as the first embodiment, and mainly different from the processing content of the virtual sound source, etc. Therefore, the different portions between the first and third embodiments will be described.

Figure 9:
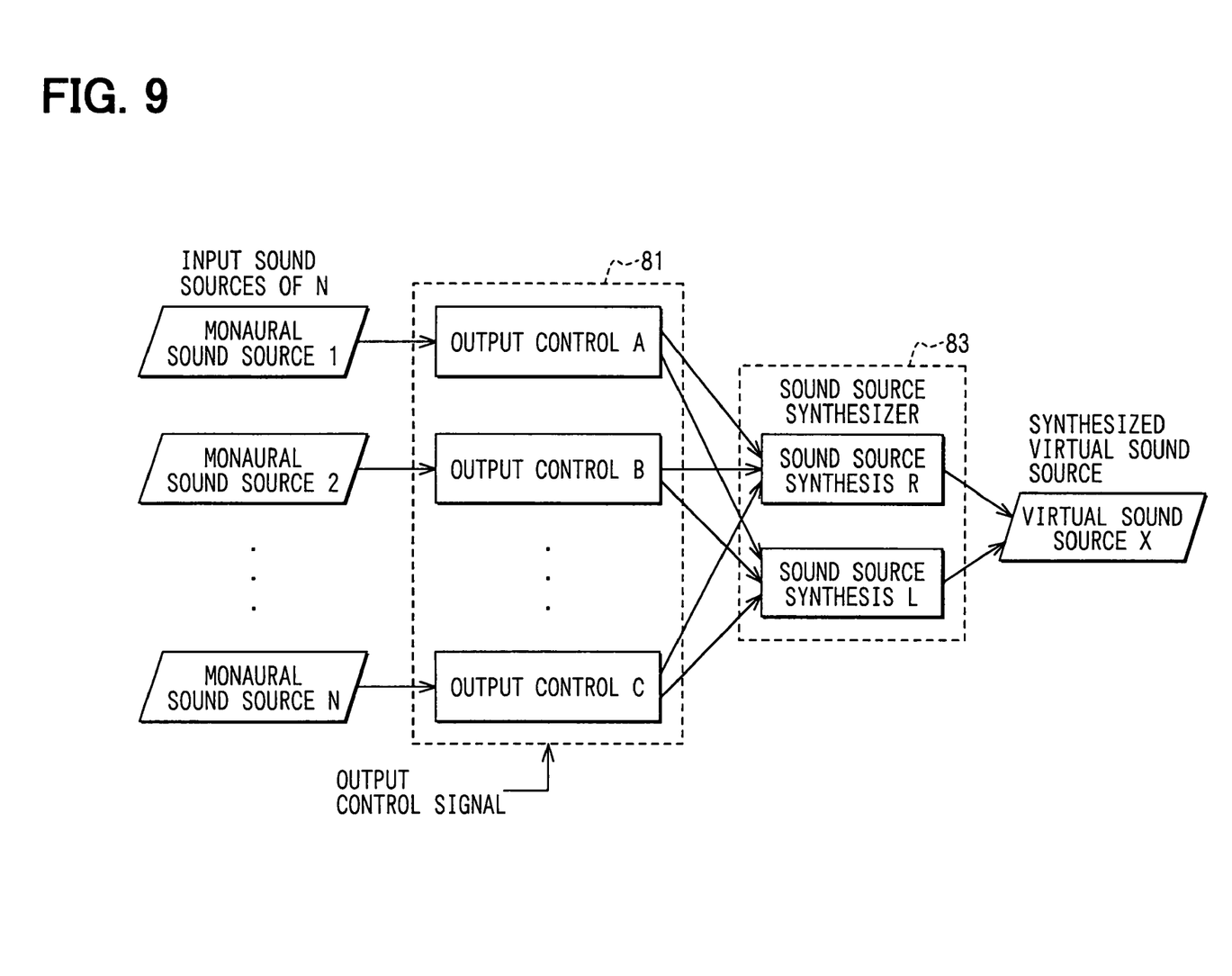
FIG. 9 is a diagram showing the procedure of calculation processing of a third embodiment.

As functionally shown in FIG. 9, for example when there are virtual sound sources of N, for example when the data of the virtual sound sources are stored in a fourth memory 49 of the virtual sound source generator 7, the processing of the virtual sound sources, etc. are carried out by DSP 47.

Specifically, which one or more of the virtual sound sources should be used is selected on the basis of an output control signal (of DSP 47) in an output controller 81.

For example, when position data are input from the obstacle detector 1 and the abnormality detector 3, which one or more of the virtual sound sources should be used is selected in accordance with an input state from each of the detectors 1 and 3.

Subsequently, plural virtual sound sources are combined with one another to generate a virtual sound source in a sound source synthesizer 83.

2-channel sound signals (corresponding to the right and left speakers 53 and 55) achieved through the above synthesis are reproduced and output from the right and left speakers 53 and 55 of the sound output unit 9, thereby implementing respective virtual sound sources at plural desired localization positions.

The output controller 81 and the sound source synthesizer 83 functionally represent the processing contents carried out by DSP 47.

The invention is not limited to the above embodiments, and various modifications may be made without departing from the present subject matter.

(1) For example, the alarm content based on the alarm sound is not limited to the detection of obstacles around the vehicle concerned and the detection of the abnormality of tire air pressure, and it may be applied to detection of an obstacle ahead of the vehicle concerned (ahead vehicle or the like) or the like by a laser radar, a camera or the like, detection of abnormality of a door open/close state (incompletely closed door or the like), detection of abnormality of abnormality of an open/close state of a trunk (during travel), etc. Furthermore, a voice alarm may be applied to a hands-free voice output of a cellular phone or the like.

(2) A well-known stereo dipole type (see JP-T-2000-506691) or the like may be adopted as the method of generating virtual sound sources.

(3) The sound outputs of CD, MD and a multi-channel audio such as a radio or the like may be handled as monaural sound sources.

What is claimed is:

1. A vehicle alarm sound output device for driving an alarm sound outputting unit on the basis of information from a condition detecting unit for detecting the condition of a vehicle or the surrounding condition around the vehicle to output an alarm sound comprising:

a position setting unit for setting a localization position of a virtual sound source of the alarm sound in accordance with the detection result of the condition detecting unit;

an alarm control unit for controlling the alarm sound output device so that a passenger of the vehicle can hear the alarm sound from the virtual sound source, wherein when there are plural contents to be alarmed to the passenger in connection with the detection result of the condition detecting unit, the localization position of the virtual sound source and the sound type of the alarm sound are altered for every content to be alarmed;

a filter coefficient generator for generating virtual sound source filter coefficients in accordance with the localization positions of the plural virtual sound sources; and a calculator for converting each of the respective virtual sound source filter coefficients and the acoustic data of the alarm sound from the real-number value of a time domain to the complex-number value of a frequency domain by fast Fourier transform, generating plural virtual sound sources by complex-number calculation between each of the virtual sound source filter coefficient and the acoustic data of the alarm sound in the frequency domain, combining the plural virtual sound sources by complex-number addition, and converting the plural virtual sound sources thus combined from the complex-number value of the frequency domain to the real-number value of the time domain by inversed Fast Fourier Transform.

2. A program for making a computer implement the function of the vehicle alarm sound output device according to claim 1.

* * * * *